Figure 1:
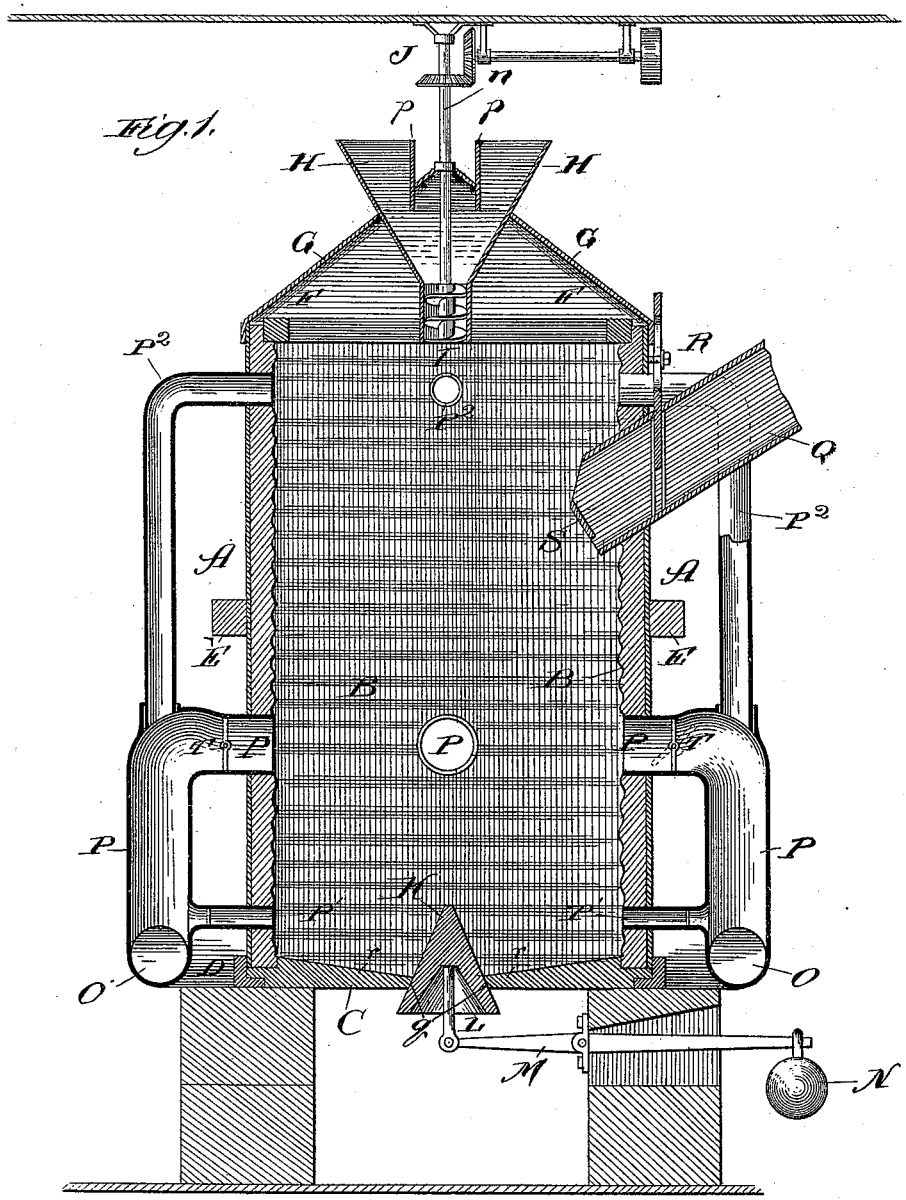

(No Model.) 2 Sheets—Sheet 1.

J. K. HALLOWELL.
PULVERIZING MACHINE.

No. 447,030. Patented Feb. 24, 1891.

Witnesses:
Chas. Gaylord.
Clifford I. White.

Inventor:
John K. Hallowell,
By Dyrenforth & Dyrenforth,
Attys.

THE NORRIS PETERS CO., PHOTO-LITHO., WASHINGTON, D. C.

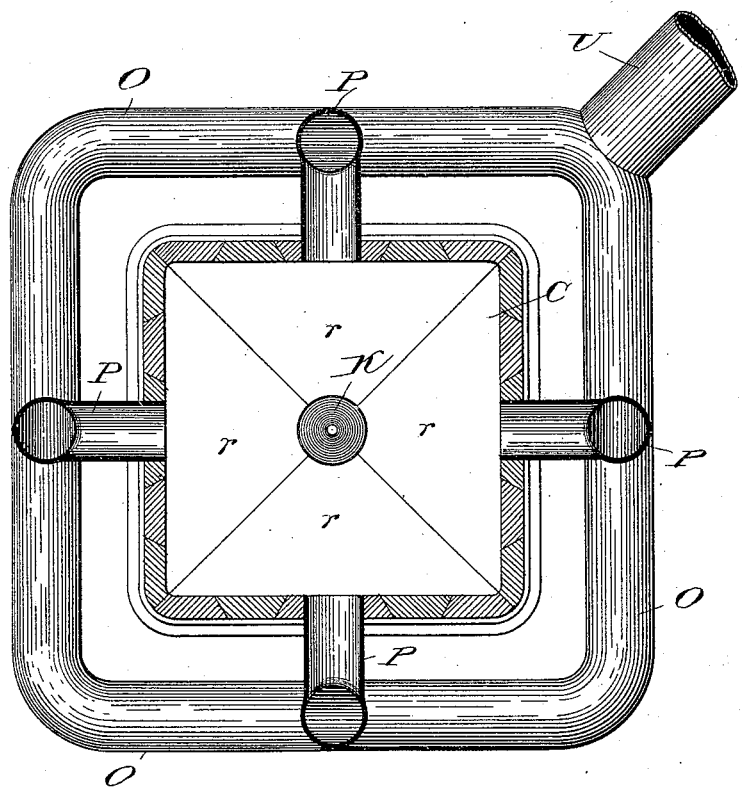

UNITED STATES PATENT OFFICE.

JOHN K. HALLOWELL, OF CAMDEN, NEW JERSEY.

PULVERIZING-MACHINE.

SPECIFICATION forming part of Letters Patent No. 447,030, dated February 24, 1891.

Application filed June 18, 1888. Serial No. 277,504. (No model.)

*To all whom it may concern:*

Be it known that I, JOHN K. HALLOWELL, a citizen of the United States, and a resident of Camden, in the county of Camden and State of New Jersey, have invented certain new and useful Improvements in Pulverizing-Machines, of which the following is a specification.

The object of my improvement is to provide a simply-constructed and durable machine of the kind for producing rapid and thorough pulverization of the material to be pulverized or less finely reduced by the action of meeting air-blasts directed under confinement against the material dropped into the pulverizing-chamber and operating to reduce it by the resulting force of attrition combined with that of percussion against the walls of the chamber, from which the pulverized product escapes with the air-currents.

In the accompanying drawings, Figure 1 shows my improved machine in sectional elevation; and Fig. 2 is a sectional plan view of the same, the section being taken just above the main air-current pipe.

The pulverizing-machine comprises a chamber of any suitable shape, as circular or angular, that illustrated being quadrangular, and formed with walls A of strong material, preferably boiler-iron. The walls are provided with lining B, formed of corrugated hard-metal plates properly secured in position to cause the corrugations to extend horizontally or substantially so. The chamber is provided with a base C, formed in V-shaped sections $r$, of smooth cast metal, adjusted together and held by a base-frame D, and formed to leave a circular opening $q$ in the center of the bottom C. Toward their centers the walls A of the chamber are re-enforced in an inward direction by binding-bars E, surrounding them, and at their upper ends the walls are re-enforced in an outward direction from their inner sides by bracing-bars F. The cover G is preferably formed in V-shaped sections adjusted together, and is arranged to overlap the upper edges of the chamber, where it is secured in place and from which it rises in pyramidal form.

H is a hopper seated in the cover G, through which it extends, and divided at its flaring or inlet end by partitions $p$ into two or more hopper-openings, thereby constituting it a multiple hopper.

In the outlet end of the hopper is a conveyer-worm I on a stem $n$, extending through the apex of the sectional cover and driven by suitable gearing, as the system of beveled gears J (illustrated) from the driving power. (Not shown.)

A cone K, which may be hollow, as shown, projects with its tapering extremity into the base of the chamber through the opening $q$ in the bottom C and is supported by its stem L on a properly fulcrumed lever M, to one end of which the lower end of the stem L is pivoted, and at the opposite end of which is provided an adjustable weight N. The chamber is surrounded near its base by a main air-pipe O, provided, preferably, at one corner with an inlet-duct U, leading from the air-pressure supply (not shown) as a blast-fan or several such fans. Branches P of the pipe O extend upward therefrom, one being provided for each wall of the chamber, through which it extends into the latter near its center, and below each branch P and extending horizontally therefrom into the pulverizing-chamber is a smaller branch P'. I also lead one or more branches P² from the same number of branch pipes P through the walls A near their upper ends to extend at right angles to the plane of the inlet of material, whereby the air introduced through the branches P², as hereinafter described, will intersect the stream of the feed near the hopper.

In each branch P, near its mouth, I provide an ordinary form of damper-valve T.

Q is the discharge-outlet for the pulverized material and air-currents, and it extends, as shown, through a wall of the chamber near the upper end of the latter.

In the discharge-outlet Q is a sliding gate R to regulate the size of the outlet to the area that will produce the required result from the action of the air-blasts forced into the chamber, as hereinafter described.

At the inner end of the outlet Q, I provide an air-current break S, affording a space below it to permit the automatic return of material insufficiently pulverized.

The multiple hopper H affords a convenient means for producing the mechanical mixture of two or more materials of which it may be desired to form an intimate intermixture previous to subsequent treatment, as in the case of ore, which may thus have the chloridizing agent (salt) thoroughly mixed with it while undergoing pulverization by introducing the ore through one hopper-opening $p$ to subject it within the chamber to the action of air-blasts and the salt simultaneously therewith through the other hopper-opening.

The construction of hopper enables readily the simultaneous introduction of the various materials, since they may be commingled in the hopper-outlet common to all the inlets before being introduced into the pulverizing-chamber, and the one common outlet necessitates but a single setting of feeding-hoppers and requires only one hopper or feed-opening to be provided in the chamber.

The operation is as follows: Air under desired strong pressure is forced through the inlet U into the pipe O, whence it enters the pulverizing-chamber through the branches, meeting inside the chamber at a common center. With the strong air-blasts thus being introduced and confined in the chamber of the pulverizing-machine, the material to be pulverized is fed through the hopper, dropping into the chamber against the meeting air-currents, which cause its attrition and its percussion against the lining, the corrugated form of which enables direct impingement of the material to take place from many of the angles of its direction by the impelling force, owing to the differently-presented planes of the corrugated surface. The material as it becomes thus reduced is carried by the air-currents to their escape-outlet Q, wherein the insufficiently-pulverized particles will fall by their own gravity and slide back into the chamber to be further acted on, while the thoroughly-pulverized portion will be carried by the air-current to the place for collecting them. (Not shown.) It will be noticed that the air-pipe branches do not according to my improved construction project beyond the interior wall of the chamber A, but the mouths of the branch pipes are flush with the interior wall-surface, thus avoiding the presentation of projecting pipe ends to the action of the material undergoing pulverization, which would rapidly wear them away, and thereby adding materially to the durability of the machine.

The adjustable cone K in the base of the pulverizer adapts it to operate to produce various degrees of granulation, as well as pulverization, and thus to serve when required, as with certain complex and homogeneous materials, for dry concentration, and particularly for the concentration of ores with native metallic values, such as native copper. This is effected by shifting the weight N (which when at the outer end of the lever M, as shown, overbalances the cone and produces tight fit thereof in the aperture $q$) toward the fulcrum till the gravity of the weight is sufficiently overcome by the cone to permit the latter to drop far enough to leave an opening around it of the desired size to permit the discharge through it of material of a given degree of granulation.

What I claim as new, and desire to secure by Letters Patent, is—

1. In combination, a chamber A, having its wall lined with corrugated hard-metal plates B and having its base formed with V-shaped sections $r$, secured by a base-frame D and affording the opening $q$, a pyramidal cover G, adapted to seat a hopper, an air-pipe O, having branches leading into the chamber through its wall, a cone-valve K, protruding at its apex through the opening $q$ into the chamber and provided with a stem L, a lever M, fulcrumed between its extremities and pivotally connected at one side of its fulcrum with the stem L, and a weight N, supported on the lever at the opposite side of its fulcrum, the whole being constructed and arranged to operate substantially as described.

2. In combination, a chamber A, having its wall lined with corrugated hard-metal plates B and having its base formed with V-shaped sections $r$, secured by a base-frame D and affording the opening $q$, external binding-bars E, internal bracing-bars F near the upper end of the chamber, a pyramidal cover G, adapted to seat a hopper, an air-pipe O, having branches leading into the chamber through its walls and flush at their mouths with the inner surfaces of the said walls, a cone-valve K, protruding at its apex through the opening $q$ into the chamber and provided with a stem L, a lever M, fulcrumed between its extremities and pivotally connected at one side of its fulcrum with the stem L, and a weight N, adjustably supported on the lever at the opposite side of its fulcrum, the whole being constructed and arranged to operate substantially as described.

JOHN K. HALLOWELL.

Witnesses:
CHAS. W. PILE,
F. G. FAXON.